United States Patent [19]

van Haaften

[11] 4,207,911
[45] Jun. 17, 1980

[54] OPERATING STATION FOR A DUCT SYSTEM THROUGH WHICH A PLUG BODY IS PUMPED

[76] Inventor: Henry M. T. van Haaften, Aquamarijnstraat 793, Groningen, Netherlands

[21] Appl. No.: 945,822

[22] Filed: Sep. 26, 1978

[51] Int. Cl.² ............................................... A01G 27/00
[52] U.S. Cl. ..................................... 137/119; 137/268; 239/66
[58] Field of Search ................... 137/119, 624.18, 112, 137/113; 239/66, 67, 70; 92/60

[56] References Cited
U.S. PATENT DOCUMENTS 3,512,554   5/1970   Chidders .......................... 137/268 X

FOREIGN PATENT DOCUMENTS 2088763   1/1972   France ........................................ 239/66

*Primary Examiner*—Alan Cohan
*Attorney, Agent, or Firm*—Diller, Ramik & Wight

[57] ABSTRACT

A duct system is provided with a pair of branch conduits each having a differential pressure operated valve. Two sets of pressure ducts are connected to the duct system and a plug member is caused to shuttle back and forth, in controlled fashion to expose one or the other sets of pressure ducts to high internal fluid pressure. Each set of pressure ducts is connected so that valve-closing operation is effected for one valve and valve-opening operation is effected for the other valve in response to high internal fluid pressure in such ducts, so that the plug will cause one valve to be open when it is held in a position between the two sets of ducts until it is released to move beyond both sets of ducts thereby to cause said one valve to close, and vice versa.

7 Claims, 5 Drawing Figures

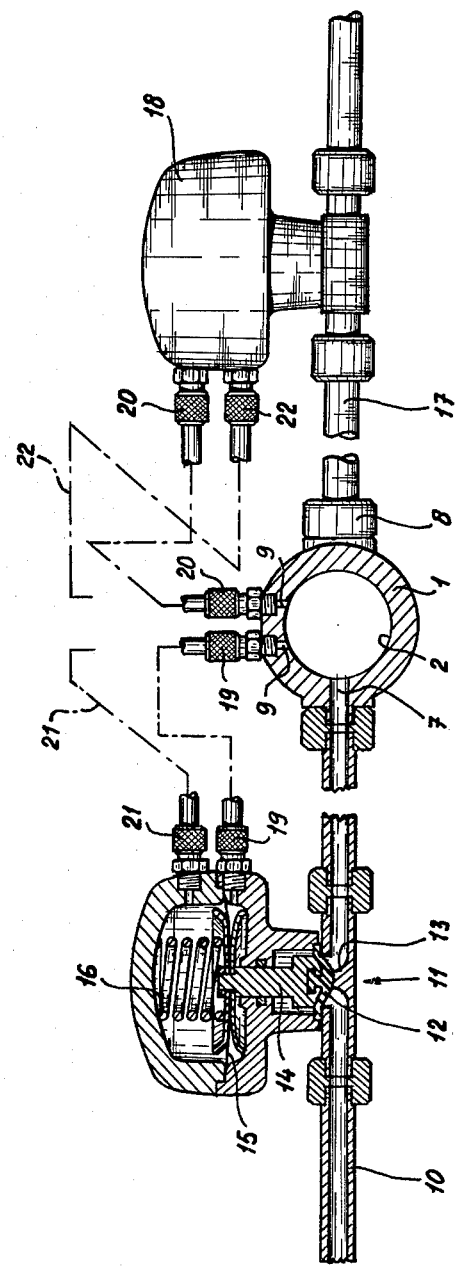

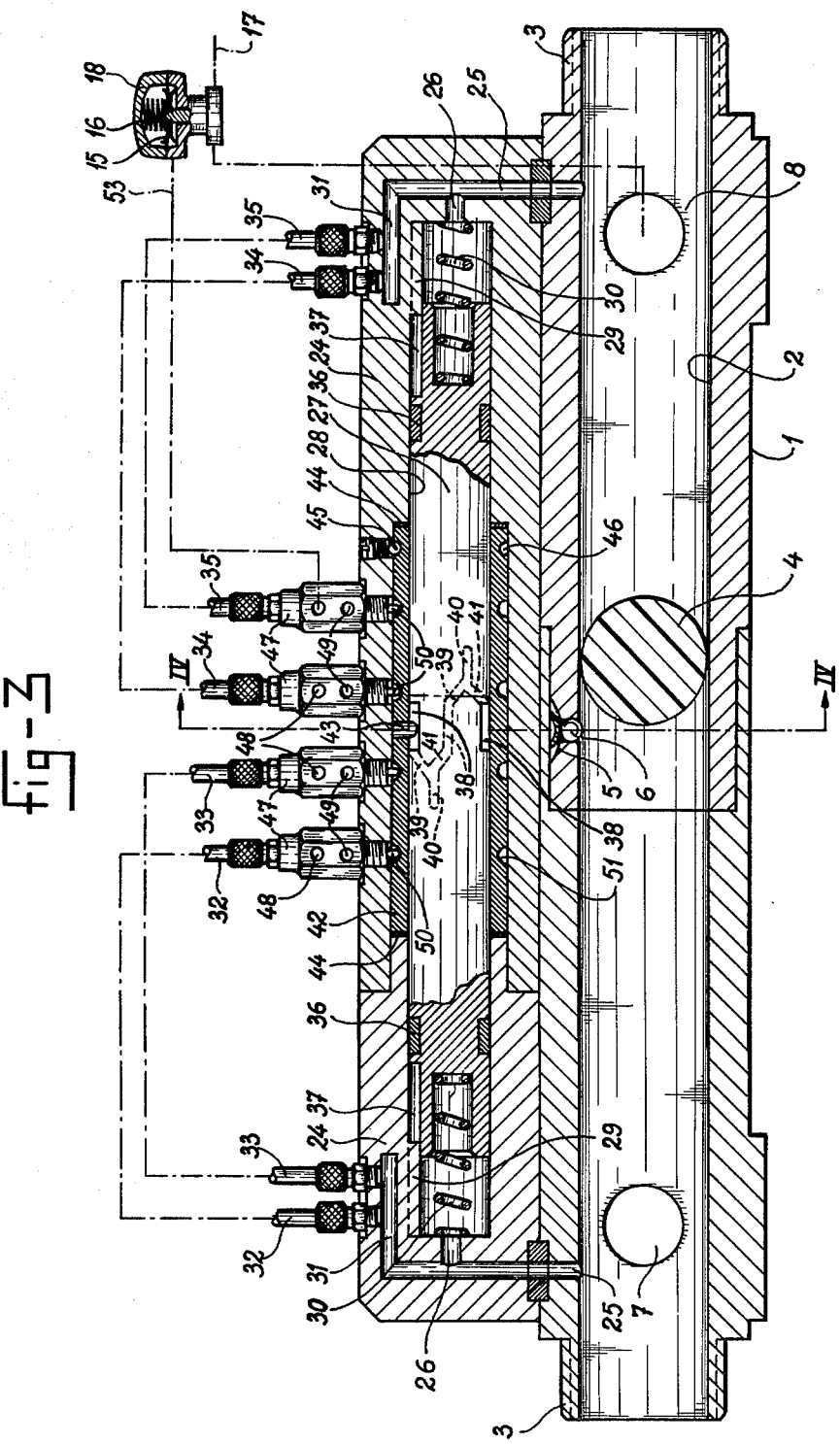

OPERATING STATION FOR A DUCT SYSTEM THROUGH WHICH A PLUG BODY IS PUMPED

This invention relates to an operating station for a duct system comprising means to pump a fluid through a duct and a plug body within said duct, adapted to move with a sliding fit through the duct by the fluid, means in the operating station to withhold the plug body therein temporarily and means to cause the plug body to leave this station and continue its movement with the fluid in the duct.

Such duct systems are known or claimed previously in different embodiments.

The plug body may itself carry programmed means to determine and govern its period of stay in such a station, as claimed in U.S. patent application, Ser. No. 809,658 filed June 24, 1977, now U.S. Pat. No. 4,150,685 of Apr. 24, 1979 by the same applicant, or there may be means in the station itself to determine and govern this period, or there may be means at the pump to temporarily increase the pressure difference in the duct between the upstream and the downstream side of the plug body to loosen the plug body from the station as soon as it is desired to have it continue its travel through the duct, as claimed in copending Ser. No. 933,619 filed Aug. 14, 1978 by the applicant.

Such systems may be used for different purposes, such as for irrigation of large arid areas where the highest possible economy in using water is required, but also for other purposes of remote control in fluid systems, particularly for liquids, where the plug body may be used as a tool or as a means used for temporarily opening valves or closing fluid discharge gates.

The present invention aims at an efficient application of such systems by applying the fluid in the duct guiding the plug body to operate actuating means such as for actuating valves by its pressure difference between upstream and downstream side of the plug body when this is withheld in an operating station. Moreover, the invention aims at obtaining a simple structure of the station and of the plug bodies to be used in the system.

To this end, an operating station as given in the preamble is according to the invention first of all characterized in that the operating station has actuating means to be operated by the fluid in the duct depending on the position of the plug body, said actuating means having two surfaces and being movable by a difference in pressure of the fluid on said surfaces, there being means to admit fluid from a zone in the duct guiding the plug body positioned to one side of the plug body when stationary in the station to one of said surfaces and to admit fluid from a zone in said duct positioned to the other side of the plug body to the other one of said surfaces.

The invention will now be explained in more detail with reference to the enclosed drawings giving by way of example only two preferred embodiments of such a station.

In said drawings:

FIG. 2 is a transverse section along the line II—II in FIG. 1, on a smaller scale, with the other parts of the station partly in section, partly in elevation;

FIG. 3 shows an axial section through an operating station in a different embodiment;

The drawings only show (parts of) operating stations. The entire duct system with pump, control means etc. is not herein shown, and for details thereof reference is made to the above indicated earlier applications made by the applicant and to the literature cited therein.

Figure 1:
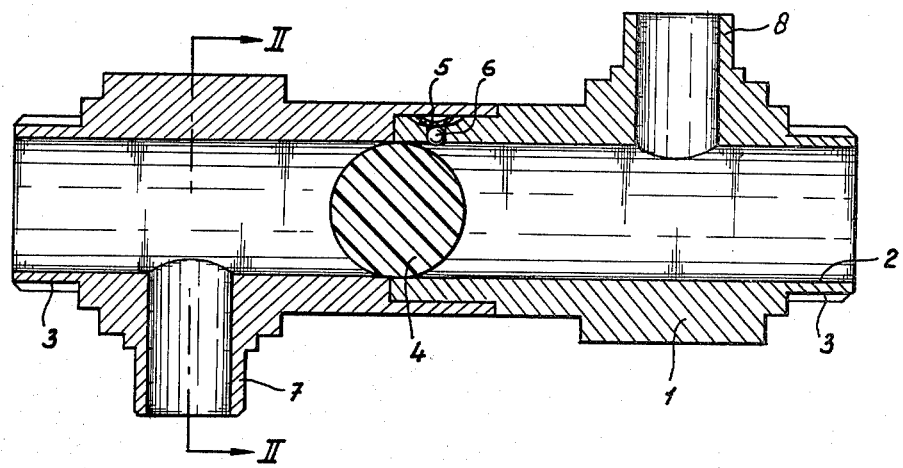
FIG. 1 is a longitudinal section through that part of a duct guiding a plug body, which is present in an operating station.

In FIG. 1 the part of the duct guiding a plug body is indicated by 1. This part has a through-going bore 2 of constant diameter and the duct part 1 has screw threaded ends 3 to be connected to further parts of the duct of the system with the same internal diameter.

A plug body 4 is movable through this duct system and fits slidingly therein so as to move easily therethrough by the difference of the pressure of a fluid such as water between the front and back faces of this plug body, said fluid being pumped into one end of the duct by a pump not shown. The plug body 4 may be a massive ball of metal or plastic material, but it may also have a cylindrical shape with spherical ends or have any of the other shapes as indicated in the applications referred to above.

The duct part 1 has means to withhold this plug body 4 in the station, such means in this case comprising in three recesses in the duct wall, evenly divided around the periphery, a small leaf spring 5 and a ball 6 urged inwardly by the leaf spring and prevented from entering fully into the bore 2 by inturned inner edges of the bore taking up the ball.

The duct part 1 has two branch duct connections 7 and 8, one to each side of the means 5 and 6, and in the same transverse plane as these connections, two smaller bores 9 as shown in FIG. 2.

Branch duct connection 7 gives connection to a branch duct 10 having a valve at 11 being, for instance, a diaphragm valve of known and commercially available type having a diaphragm 12 adapted to be seated on a dam 13 in the duct and movable up and down by a stem 14 operated by a spring loaded diaphragm 15. The loading spring 16 urges the diaphragm 15, the stem 14 and the diaphragm 12 downwards so as to keep the valve 11 closed if no other steps are taken, as will be described below.

The branch connections 8 is connected to a branch duct 17 having a valve 18 similar to the valve 11. The branch ducts 10 and 17 may extend over considerable distance and may, for instance, have spray nozzles at mutual distances for irrigation purposes.

Each bore 9 shown in FIG. 2 gives connection to a duct leading to one of the valve 11 or 18. The left bore 9 in FIG. 2 gives connection to a duct 19 opening in the casing of valve 11 below the diaphragm 15 and the duct 20 gives connection to the space in the casing of valve 18 above the diaphragm as shown for duct 21 in valve 11 in the left part of FIG. 2. As stated, there are also two bores 9 near the right end of duct part 1 as seen in FIG. 1, in the plane of branch connection 8 and of these bores one gives connection to duct 21 opening above the diaphragm 15 in the casing of valve 11 and the other bore giving connection to duct 22 opening in the casing of valve 18 below the diaphragm therein.

The operation of this station is as follows: If the plug body 4 enters the duct part 1 from the left as seen in FIG. 1 by fluid such as water, pumped into the duct, the plug body 4 moves until it is withheld by the balls 6 protruding in the central part of said duct. Before the plug body 4 enters this station, the pressure in the bore 2 of duct part 1 is substantially the same over its length, being either the higher pressure behind the plug body as given by the pump or the lower pressure in front of the moving plug body. Both valves 11 and 18 are then in the closed position i.e. they close the branch ducts 10 and 17. With the plug body 4 in duct part 1 passing branch 7 to branch duct 10, the pressure in the two bores 9 in the plane of the branch connection 7 will become higher than the pressure through the bores 9 in the plane of branch connection 8. This means that the fluid pressure communicated through ducts 19 and 20 to the valves 11 and 18 will become higher than the fluid pressure communicated to these valves through ducts 21 and 22. This means that in valve 11 the pressure in the casing below the diaphragm 15 will rise to a much higher value than the pressure above the diaphragm in the fluid entering this valve casing through duct 21. Valve 11 is thus opened. Thereby fluid such as water is branched off through connection 7 and branch duct 10 and is, for instance, distributed by this branch duct by being sprayed through a number of nozzles for irrigation purposes. Valve 18 will remain closed as the pressure above its diaphragm will rise by the fluid through duct 20 and this will only press this valve by more force into its seat such as the dam 13 as shown in FIG. 2 for valve 11.

Discharge of fluid through branch duct 10 goes on until the plug body 4 is caused to leave the station. This may be obtained in this case by increasing the pressure in the duct 1 to the left of the plug body in the manner as shown in the above indicated application Ser. No. 933,619 by the applicant. This higher pressure on the plug body 4 causes it to push the three balls 6 outwardly against the spring action of the small leaf springs 5 so that the plug body 4 continues its path through the duct to the right in FIG. 1. As soon as the plug body has passed the bores 9 at the right in the plane of branch connection 8, the pressure of the fluid through all the four bores 9 becomes substantially equal, so that the pressure in duct 21 rises to the same value as the pressure through duct 19 so that there is no more any pressure difference by the fluid on diaphragm 15. This allows spring 16 to push the diaphragm 15 downwardly together with the stem 14 and the diaphragm 12 and thus to close valve 11.

As explained in application Ser. No. 933.619, the system may have a kind of gate to allow passage of the plug body 4 from the downstream end of duct 1 to the upstream end thereof, but in the present case it is assumed that there is a more simply system in which the plug body 4 is caused to move back and fro through duct 1. This may easily be obtained by having the pump give connection to both ends of duct 1 with suitable valves therein, operated by hand or by other means to have the pump discharge fluid into one end of the duct to move the plug body until this reaches the other end of the duct, after which one valve is closed and the other one is opened to have the pump now pump fluid into the opposite end of the duct to cause movement of the plug body in the opposite direction. This will not need further explanation. The fluid pushed out of the duct by the plug body is front thereof may easily be discharged from the duct by discharge ducts with valves, which are opened and closed together with the switching of the valves for supplying fluid thereto from the pump so that, if the pump pumps fluid into one end of the duct, the other end is opened to such discharge and the reverse.

This means that after some time the plug body 4, having reached the end of the duct near the pump, begins to move in the opposite direction, so that after some time it now enters the station from the right in FIG. 1. Also for this direction of movement the balls 6 are able to withhold the plug body 4, but now in a position somewhat more to the right than the position shown in FIG. 1, and as soon as the plug body 4 passes the branch duct 8 and the bores 9 in the same transverse plane, the pressure in said bores will rise and become higher then the pressure through the bores 9 at the left end of FIG. 1 in the plane of connection 7. This means that this higher pressure will now act through ducts 21 and 22 on the valves. For valve 11 this does not matter as it will only increase the pressure above the diaphragm 15 to keep it closed, but the higher pressure through duct 22 acting below the diaphragm in valve 18 will cause this diaphragm to move upwardly against the action of its spring comparable to spring 16 of valve 11 to open this valve so that fluid will now flow out of duct 1 through connection 8 and branch duct 17, for instance for irrigation purposes. In this way, branch ducts 10 and 17 will discharge fluid alternatively. If for a certain station it is sufficient to have only one such branch duct for discharging fluid, the branch ducts 10 and 17 may be connected into one duct leading to spray nozzles or the like.

It will be clear that this structure of the station is very simple and that also the plug body is of a very simple nature. In several embodiments of operating stations given in the above-indicated earlier applications the plug body has radially expandable or compressible means and in the duct through which the plug body is guided there is a narrowed or widened part of a sleeve, which is axially moved by the plug body when being withheld by such wider or narrower part and its expandable or compressible means. In the present case, by using the pressure difference to both sides of the plug body when withheld in the station, this is not necessary and the simple balls 6 with leaf springs 5 are sufficient to withhold a simple plug body and there is no need for a sleeve in the duct moved axially by the plug body.

Figure 4:
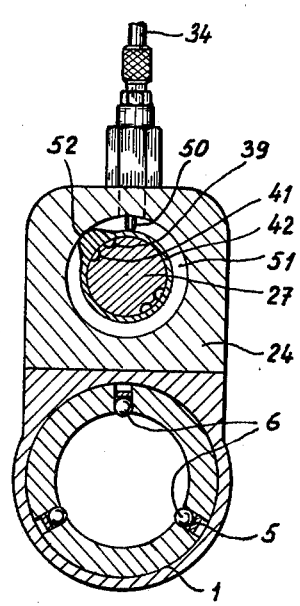
FIG. 4 shows a transverse section and elevation along the line IV—IV in FIG. 3.

In the embodiment of FIGS. 3 and 4 there is again a duct part 1 with a continuous bore 2, a plug body 4, balls 6 with leaf springs 5 for withholding the plug body in the station and branch duct connections 7 and 8. Passages 25 comparable to the bores 9 of FIG. 1 lead from a zone near the branch connections 7 and 8 through a casing 24 on the one hand to spaces 31 and on the other hand to side bores 26 admitting the fluid to the ends of a mainly cylindrical space 28. In said space 28 there is a mainly cylindrical body 27 sealed therein near both ends by sealing rings 36 and being prevented from rotational movements by a spline or key 29 in the casing engaging a corresponding longitudinal groove 37 in the body 27. Springs 30 at both ends tend to keep the body 27 in its intermediary position as shown.

Near its centre the body 27 has a groove 38, 39, 40, 41 of a shape as shown extending all around this body.

Around this body 27 a sleeve 42 is taken up in casing 24 and this sleeve 42 is rotatable in said casing but not axially movable. It has an inwardly directed pin 43 engaging, in the position shown, in one of the grooves 38. There may be more such pins evenly divided among the periphery in the same plane perpendicularly to the length of body 27 each engaging one of the grooves 38.

At both ends the sleeve 42 is in contact with a low friction ring 44 to allow easy rotation thereof in the casing. An arresting ball 45 in casing 24 is spring urged inwardly into recesses 46 in the sleeve to arrest it in one of a number of angular positions to be described and corresponding to positions of body 27 in which the pin 43 is either in a groove part 38 or in a groove part 40.

To the spaces 31 in casing 24 are connected ducts 32, 33, 34 and 35, the first two being connected to the space 31 at the left and the other two to the space 31 at the right. Each of said ducts leads to a servo-valve 47, shown in elevation in FIG. 3 and shown in longitudinal section in FIG. 5. Each of these valves has, apart from the inlet for fluid from one of the ducts 32-35 at the top, two connections, a connection 48 for leading fluid under pressure to a part to be operated such as a hydraulically operated diaphragm valve and a duct connection 49 being a relief connection, and for operating these valves they each have a small pusher rod 50 protruding downwardly, each into a circumferential groove 51 in sleeve 42. As appears from FIG. 4, each groove 51 does not extend over the entire periphery of the sleeve 42, but is interrupted by a dam or cam part 52, and the several cam parts 52 are divided evenly around the periphery of sleeve 42 so that they are 90° apart.

Only for the right hand valve 47 a duct 53 is shown, leading to a valve 18 as in FIG. 2 and corresponding in structure to valve 11 of FIG. 2, with the only difference, that the space above the diaphragm 15 only has a spring for keeping the valve closed such as the spring 16 in FIG. 2, but no entry for fluid or at least no duct connected thereto. This valve 18 is taken up in a branch duct 17 connected to branch connection 8 in bore 2. Branch duct 17 is indicated by a dot and dash line only. The other valves 47 are each by their connection 48 connected to such a valve like 18 and there are four of such valves, one for each valve 47. Each of such valves is connected to a branch duct like 10 in FIG. 2 and 17 in FIGS. 2 and 3. There are four branch duct connections like 7 and 8 in this sense that there is one other branch duct connection opposite connection 7 in FIG. 3 and another one opposite connection 8.

The operation of this station is as follows: When the plug body 4 is not present in the station, the pressure of the fluid in bore 2 of duct 1 is substantially the same throughout the length of the station so that body 27 is in its intermediary position as shown. As soon as the plug body 4 enters the station and has passed, for instance, from left to right in FIG. 3, the opening of passage 25, the fluid in the duct behind the plug body 4 having a considerably higher pressure than the fluid in front of and in this case to the right of the plug body, this higher pressure will act through passages 25 and 26 on the body 27 in space 28 to push this body to the right. Thereby the inclined groove part 39 immediately joining the axial groove part 38, in which the cam or pin 43 is present in FIG. 3, will reach this pin or cam 43 so that it rotates sleeve 42 until the pin or cam 43 reaches the axial groove part 40 pointed to the left in FIG. 3. In this position of sleeve 42 the dam or cam 42 (FIG. 4) is below one of the pushing rods 50 of a valve 47 connected to duct 32 or duct 33 so that this valve is opened. This means that for this valve the fluid from duct 1 and passages 25 and 31 is allowed to flow through duct 32 or 33 and through the now opened valve out through connection 48 to a valve like 18 in one the branch ducts such as 17. The connection internally of the valve 47 between external connection 48 and external connection 49 is interrupted, so that in the concerning diaphragm operated valve like 18 the space below the diaphragm 15 is no more in communication with this relief connection 49, but is connected to the fluid from duct 1 at the pressure prevailing behind the plug body, so that the concerning diaphragm operated valve is opened to give dischage through connection 7 or the connection opposite thereto into the concerning branch duct and from thereto, for instance, spray nozzles for irrigation purposes. This diaphragm operated valve 18 is thus kept open until the plug body 4 is caused to leave the station so that the pressure to both sides of body 27 will become equal and this body will return to its intermediate position as shown. This will cause pin or cam 43 to move from the concerning groove part 40 into groove part 41 and from there to the next axial groove part 38 so that the plug body is in a position rotated over 90° with respect to the position shown in the drawing. That pin or cam 43 will not return to the inclined groove part 39 is due to the fact that, in a manner known as such, the groove parts 39 and 41 are not symmetrical as seen from the groove part 40, but that, when the body 27 moves to the left the pin or cam 43 will contact the opposite inclined wall of groove 41 by a shape of the grooves as shown.

When the body 42 is thus rotated by groove 41, the cam or dam 52 will liberate the pushing rod 50 of the concerning valve and this will thus close, interrupting the connection between the concerning duct 32 or 33 to connection 48 and connecting connection 48 internally with a relief connection 49, so that the space below diaphragm 15 of the concerning valve like 18 is relieved from pressure and fluid may be pushed out by the spring pushing diaphragm 15 downwardly, so that the concerning diaphragm operated valve closes easily.

If thereupon plug body 4 enters the station again from the opposite side, in this case from right to left in FIG. 3, one of the valves 47 connected to duct 34 or duct 35 will be operated in the same manner as described for one of the duct connections through 32 and 33 above.

If in a later stage the plug body 4 enters the station again from left to right in FIG. 3, the other one of the valves 47 at the left, connected to duct 32 or 33, will be operated. In this way the same plug body 4 may operate four diaphragm operated valves like 11 or 18 and this number may be increased at will.

If the plug body 4 would circulate in the same direction so as to enter the stationonly from the same side, as explained above, the structure of the station may easily be adapted thereto, and in this case the branch ducts at the right like 8 and 17 should be omitted, the ducts 32-35 should all lead from the left hand space 31 to their valve 47 and there may, of course, by any desired number of branch connections like 7 and ducts like 10 or 17 at the left end of the station behind the plug body in its position withheld by the balls 6. There may also be one branch connection like 7 split up outside the station for instance into four branch ducts each having a diaphragm operated valve like 11 or 18. In this case the higher pressure behind the plug body 4 will always push body 27 to the right in FIG. 3, so that all the grooves 39, 40 and 41 should point to the left from groove 38 as seen in FIG. 2, instead of being directed alternatingly to the left and to the right as shown.

Figure 5:
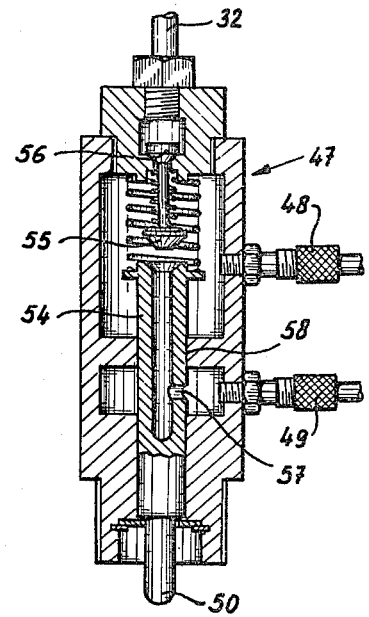
FIG. 5 shows a longitudinal section through one of the servovalves of FIG. 3 on a larger scale, e.g. twice the real size.

FIG. 5 shows a valve 47 in a commercially available embodiment in section, but other embodiments are also possible and known. Pusher rod 50 is integral with a body 54, which has a side bore 57 to an internal longitudinal bore therein, normally open at its top in the position shown to give a relief path for the fluid from pressure connection 48 to relief connection 49, which may lead to a tank or simply spill the very small amount of fluid passing outwardly therethrough. If pusher rod 50 is lifted by cam 52 (FIG. 4), the bore in body 54 will first be closed by valve 55 and will, by further upward movement, lift the body formed by valves 55 and 56 to open valve 56 and connect the duct 32 to connection 48. Opening 57 is meanwhile closed by dam 58. Valve body 55, 56 and rod 50 with body 54 are pushed downwardly by springs as shown.

It will be clear that deviations from the embodiments shown and combination of features thereof are possible within the scope of my invention and of the appended claims.

What I claim is:

1. An operating station for a duct system comprising means to pump a fluid through a duct and a plug body within said duct, adapted to move with a sliding fit through the duct by the fluid, means in the operating station to withhold the plug body therein temporarily and means to cause the plug body to leave this station and continue its movement with the fluid in the duct, characterized in that the operating station has actuating means to be operated by the fluid in the duct depending on the position of the plug body, said actuating means having two surfaces and being movable by a difference in pressure of the fluid on said surfaces, there being means to admit fluid from a zone in the duct guiding the plug body positioned to one side of the plug body when stationary in the station to one of said surfaces and to admit fluid from a zone in said duct positioned to the other side of the plug body to the other one of said surfaces.

2. An operating station according to claim 1, in which said actuating means operate a valve, said valve being adapted to be closed when the said pressures are substantially equal and to open by said pressure difference due to the presence of the plug body in the station.

3. An operating station according to claim 2, characterized in that the said valve is present in a discharge duct connected to the duct guiding the plug body to discharge fluid therefrom if the said valve is opened.

4. An operating station according to claim 1, for a duct system with means to move the plug body through the duct alternatingly in opposite directions, in which there are two sets of actuating means, duct means guiding the fluid from a zone to one side of the plug body when stationary in the station to said one surface of one of said actuating means and to the said other one of said surfaces of the other actuating means, and duct means guiding the fluid from a zone to the other side of the plug body when stationary in the station to the other one of said surfaces of the said one of said actuating means and to said one surface of said other one of said actuating means.

5. An operating station according to claim 1, characterized in that the actuating means have cams means to operate any of a number of valves depending upon their position.

6. An operating station according to claim 5, characterized in that the actuating means comprise a body linearly movable by said pressure difference, surrounded by a sleeve, rotatable around said body, cooperating cam and guide means between the body and the sleeve causing rotation of the sleeve when the body is linearly moved and cam means on the sleeve to operate one of said valves selected depending upon the angular position of said sleeve.

7. An operating station according to claim 6, characterized in that the cam means between said body and said sleeve are embodied so as to cause rotation of said sleeve in one direction only if the body is moved alternatingly in one and the opposite linear direction by the fluid pressures differing depending on the plug body entering the station alternatingly from one side and from the other side.

* * * * *